United States Patent
Shetty et al.

(10) Patent No.: US 12,326,655 B2
(45) Date of Patent: Jun. 10, 2025

(54) CAMERA SHUTTER SYSTEM WITH INCREASED SECURITY

(71) Applicant: DISH Network Technologies India Private Limited, Karnataka (IN)

(72) Inventors: Vikram Balaraja Shetty, Bengaluru (IN); Praveen Kumar G, Mangalore (IN); Visali Manoharan, Vangaram (IN); Manasa Jami, Visakhapatnam Andhra Pradesh (IN); Srinidhi An, Shivamogga (IN); Ramegowda Thimmegowda, Karnataka (IN); Arun Pulasseri Kalam, Hassan (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 18/544,743

(22) Filed: Dec. 19, 2023

(65) Prior Publication Data

US 2024/0264508 A1     Aug. 8, 2024

Related U.S. Application Data

(63) Continuation-in-part of application No. 18/189,455, filed on Mar. 24, 2023.

(30) Foreign Application Priority Data

Feb. 6, 2023   (IN) .............................. 202341007499
Oct. 31, 2023  (IN) .............................. 202341074079

(51) Int. Cl.
  *G06F 3/16*   (2006.01)
  *G03B 7/26*   (2021.01)
  *H04N 23/65*  (2023.01)

(52) U.S. Cl.
  CPC ............... *G03B 7/26* (2013.01); *G06F 3/167* (2013.01); *H04N 23/65* (2023.01); *G03B 2217/007* (2013.01)

(58) Field of Classification Search
  CPC ...... H04N 23/65; H04N 23/66; H04N 23/667; H04N 23/69–695; G03B 11/041–045
  See application file for complete search history.

(56) References Cited

U.S. PATENT DOCUMENTS

| | | |
|---|---|---|
| 5,270,576 A | 12/1993 | Kahle |
| 7,548,255 B2 * | 6/2009 | Bear ...................... H04N 23/66 348/207.11 |
| 8,302,145 B2 | 10/2012 | Levine et al. |

(Continued)

FOREIGN PATENT DOCUMENTS

JP      2007243811 A  *  9/2007

*Primary Examiner* — Leon W Rhodes, Jr.
(74) *Attorney, Agent, or Firm* — Kilpatrick Townsend & Stockton LLP

(57) ABSTRACT

Various arrangements are presented that involve an automated shutter control system being used with a separate and distinct video camera. The automated shutter control system can include a shutter, a shutter motor, power sensing circuitry that measures an amount of power being supplied to the electronic display, and a processing system. The processing system controls the shutter motor that causes the shutter to be actuated to an open position or a closed position based on the amount of power being supplied to the electronic display as measured by the circuitry of the power sensing circuitry.

20 Claims, 11 Drawing Sheets

(56) References Cited

U.S. PATENT DOCUMENTS

| | | | |
|---|---|---|---|
| 8,303,145 B2 | 11/2012 | Wilcox | |
| 11,237,457 B2 | 2/2022 | Ushio et al. | |
| 11,656,532 B2* | 5/2023 | Goh | G03B 11/043 |
| | | | 396/501 |
| 11,681,204 B2 | 6/2023 | Huang et al. | |
| 11,815,786 B2* | 11/2023 | Sawanobori | G06F 1/1686 |
| 2006/0109384 A1* | 5/2006 | Miller-Smith | H04N 21/4432 |
| | | | 348/730 |
| 2009/0091192 A1 | 4/2009 | Robertson et al. | |
| 2014/0310744 A1* | 10/2014 | Gelonese | H04N 21/4126 |
| | | | 725/133 |
| 2015/0163385 A1 | 6/2015 | Haddad | |
| 2019/0045263 A1* | 2/2019 | Gatto | H04N 21/42221 |

* cited by examiner

CAMERA SHUTTER SYSTEM WITH INCREASED SECURITY

CROSS REFERENCE TO RELATED APPLICATIONS

This application is a continuation-in-part of U.S. Non-Provisional patent application Ser. No. 18/189,455, filed on Mar. 24, 2023, which claims priority to Indian Provisional Patent Application No. 202341007499, filed on Feb. 6, 2023, in the Indian Intellectual Property Office, the disclosures of which are incorporated by reference in their entirety for all purposes.

This application claims priority to Indian Provisional Patent Application No. 202341074079, filed on Oct. 31, 2023, in the Indian Intellectual Property Office, the disclosure of which is incorporated by reference in its entirety for all purposes.

BACKGROUND

Network-connected video cameras provide end users with advantages, such as the ability to have remote face-to-face communications with friends, colleagues, and even strangers. However, with the prevalence of such cameras comes privacy and security concerns: a camera may be capturing and transmitting video unbeknownst to the end user. For end users having such cameras in their home or business, their privacy or security could be inadvertently or surreptitiously violated. Other potential end users may not own or install such a camera because of such concerns. Embodiments detailed herein help address these and other problems.

SUMMARY

Various embodiments are described related to an automated shutter control system. In some embodiments, an automated shutter control system is described. The system may comprise a shutter configured to block a lens of a camera. The system may comprise a shutter motor that moves the shutter. The system may comprise a first socket configured to be connected with a first power cable plug of a set top box (STB). The system may comprise a plug configured to be connected with an outlet through which power may be received for the automated shutter control system and the STB. The system may comprise a power sensing circuitry that measures a first amount of power being supplied to the STB. The system may comprise a processing system, comprising one or more processors, that may be in communication with the shutter motor and the power sensing circuitry. The processing system may be configured to, based on the first amount of power being supplied to the STB as measured by the power sensing circuitry, transmit a signal to the shutter motor that may cause the shutter to be actuated to an unblocked position or a blocked position.

Embodiments of such a system may include one or more of the following features: a second socket configured to be connected with a second power cable plug of a display. The power sensing circuitry may further measure a second amount of power being supplied to the display. The processing system may be configured to transmit the signal to the shutter motor additionally based on the second amount of power being supplied to the display. The processing system may be further configured to receive a spoken voice command. The processing system may be further configured to analyze the spoken voice command. The processing system being configured to transmit the signal to the shutter motor may be further based on the analyzed spoken voice command. The processing system may be further configured to analyze the first amount of power being supplied to the STB. The spoken voice command may be received after analyzing the first amount of power being supplied to the STB. Analyzing the spoken voice command may comprise determining that the spoken voice command was spoken by an authorized user. The system may further comprise the STB. The STB may be configured to receive a spoken voice command via a microphone of the STB. The STB may be configured to analyze the spoken voice command. The STB may be configured to transmit a message to the processing system indicative of the spoken voice command. The system may further comprise a remote control and the STB. The remote control may be in wireless communication with the STB and the remote control may comprise a fingerprint sensor. The remote control may be configured to receive a fingerprint via the fingerprint sensor. The remote control may be configured to transmit an indication of the fingerprint to the STB. The STB may transmit an indication of the fingerprint being authorized to the processing system. The shutter, when in the blocked position, may block a camera lens of a video camera, the video camera being separate and distinct from the automated shutter control system. The shutter, when in the unblocked position, may permit the camera lens of the video camera a field of view unobstructed by the shutter. The processing system may be further configured to receive an indication of a make and a model of the display. The processing system may be further configured to access a data store to retrieve a threshold value mapped to the make and the model of the display. The processing system may be further configured to compare the retrieved threshold value with the amount of power being supplied to the display. The processing system may be further configured to transmit the signal to the shutter motor that may cause the shutter to be actuated to the unblocked position or the blocked position further based on comparing of the amount of power with the retrieved threshold value mapped to the make and the model of the display. The processing system may be further configured to perform a learning process that may comprise monitoring a power usage of the display for at least a defined period of time. The processing system may be further configured to perform a learning process that may comprise determining an active power usage value and a standby power usage value for the display based on monitoring the power usage for at least the defined period of time. The processing system may be further configured to calculate a threshold value using the determined active power usage value and the determined standby power usage value. The processing system may be further configured to compare the calculated threshold value with the amount of power being supplied to the display. The processing system may be further configured to transmit the signal to the shutter motor that may cause the shutter to be actuated to the unblocked position or the blocked position further based on comparing of the amount of power with the calculated threshold value. The camera may be separate and distinct from the automated shutter control system. The camera may be integrated with a display.

In some embodiments, a method for using an automated privacy shutter control system is described. The method may comprise installing an automated shutter control system such that a plug of the automated shutter control system may be connected with an outlet through which power may be received for the automated shutter control system, and a set top box (STB). The automated shutter control system may comprise a shutter configured to block a lens of a camera.

The automated shutter control system may comprise a shutter motor that moves the shutter. The automated shutter control system may comprise the plug configured to be connected with the outlet. The automated shutter control system may comprise a first socket configured to be connected with a first power cable plug of the STB. The automated shutter control system may comprise circuitry that measures an amount of power being supplied to the STB. The method may comprise connecting the first socket of the automated shutter control system with the first power cable plug of the STB. The method may comprise adjusting a position of the shutter of the automated shutter control system based on the amount of power being supplied to the STB.

Embodiments of such a method may include one or more of the following features: the automated shutter control system further may comprise a second socket configured to be connected with a second power cable plug of a display. The method may further comprise connecting the second socket of the automated shutter control system with the second power cable plug of the display. The circuitry may further measure a second amount of power being supplied to the display and the position of the shutter may be further adjusted based on the second amount of power being supplied to the display. The method may further comprise receiving a spoken voice command from a microphone. The method may further comprise analyzing the spoken voice command to determine if access to the camera may be permitted. Adjusting the position of the shutter may be further based on the spoken voice command. The spoken voice command may be only eligible to be received after the amount of power supplied to the STB is determined to be above a threshold. Analyzing the spoken voice command may comprise determining that the spoken voice command was spoken by an authorized user.

BRIEF DESCRIPTION OF THE DRAWINGS

A further understanding of the nature and advantages of various embodiments may be realized by reference to the following figures.

DETAILED DESCRIPTION

Figure 1A:
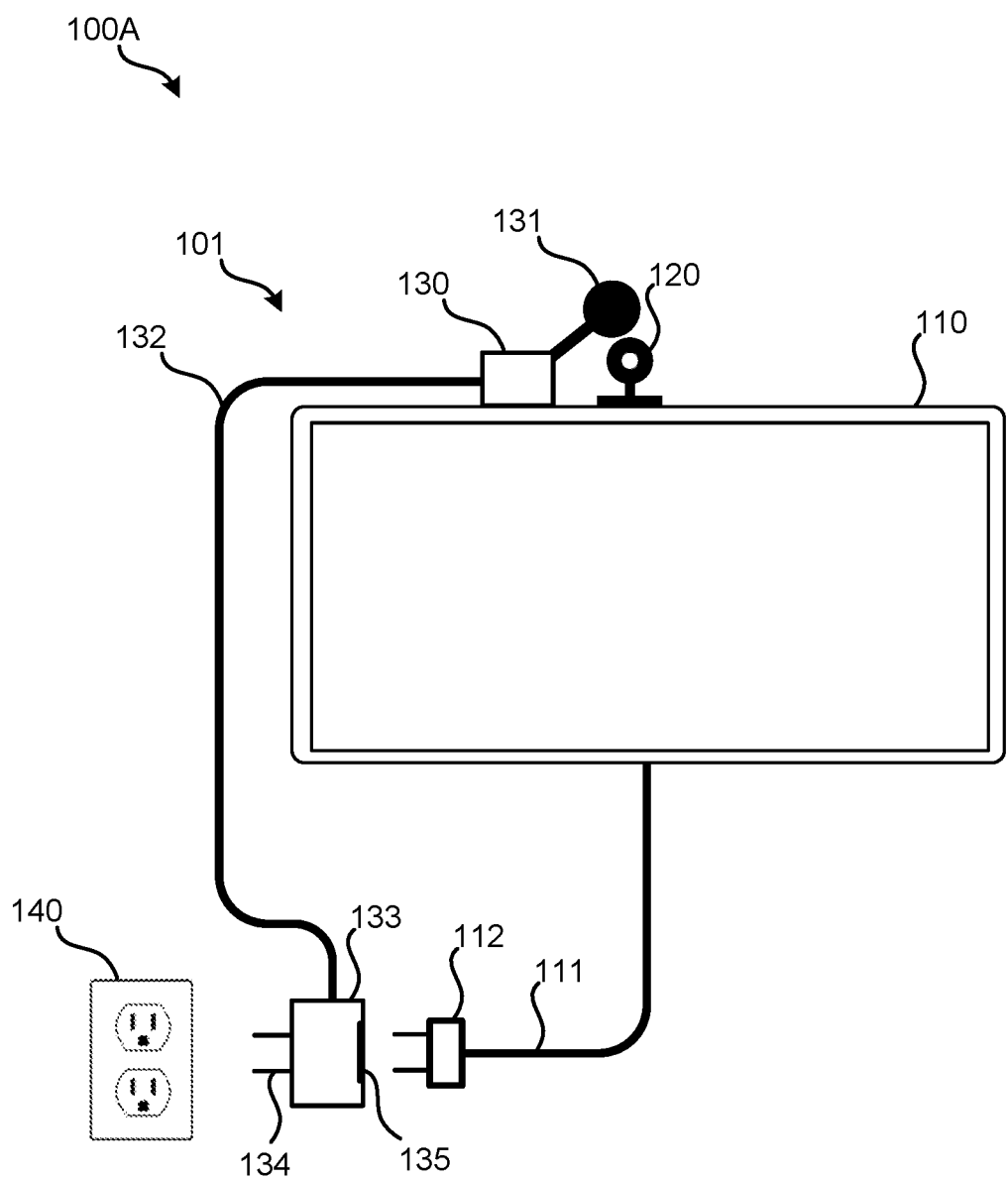
FIG. 1A illustrates an embodiment of an automated privacy shutter control system being used in conjunction with a display and a video camera.

An automated shutter control system ("ASCS") can be used to help improve security and privacy when a network-connected video camera is installed. The ASCS can actuate a shutter that either obscures the field of view of the video camera or permits the video camera to see the field of view.

In order to control the shutter, rather than requiring user input as to the desired state of the shutter, the state of an electronic display device, such as a television, set to box (STB), or both, are sensed. Power sensing circuitry is used to determine if the display and/or STB are in standby mode ("off") or is in an active mode ("on"). Based upon the determined state of the display device and/or STB, the lens of the video camera is either blocked or unblocked by the ASCS.

Additional layers of security can also be added. Sensing the power levels of the STB and/or the display may be preconditions for receiving a voice command. After determining that the STB and/or display are on, monitoring for a voice command may be performed. A voice command could be received directly by a component of the ASCS or a device in communication with the ASCS, such as the STB. The voice command can be analyzed for what was said (e.g., "open the shutter") and, possibly, for whether the command was spoken by an authorized user.

Additionally or alternatively, a fingerprint may be analyzed. A user may have a remote control in communication with an STB, wherein the remote control can receive a fingerprint. The remote control itself or the STB can analyze the fingerprint to determine if the fingerprint is mapped to an authorized user. If so, an authorization message can be transmitted to the processing system of the ASCS to authorize actuation of the shutter.

Different makes and models of electronic displays have vastly different standby mode power consumptions and active model power consumptions. For example, the active mode power consumption of one display may be less than the standby model power consumption of another display. Therefore, the ASCS needs to be able to flexibly identify a display's mode across varying power usage levels. To do so, various arrangements detailed herein can be employed, such as: a data store that maps particular makes and models to defined threshold values; a training process in which an end user sets the display device to each mode to allow the APSCS to calculate a threshold; or a learning process where use of the display device is monitored for a period of time to determine a threshold. A similar analysis can be performed for the STB or, since fewer makes/models of STBs may be used, pre-defined stored threshold values may be determined offline and stored to the ASCS.

Once a threshold has been determined, based on whether power consumption of the display device is above or below the threshold, the shutter is actuated to a closed position (obscuring the camera) or an open position (allowing the camera to view the ambient environment). If both an STB and display is monitored, both devices may be required to have a power level above respective defined thresholds for the shutter to be opened. Detail regarding these embodiments and other variations are provided in relation to the figures.

FIG. 1A illustrates an embodiment 100A of ASCS 101. Embodiment 100A includes display 110 being used in conjunction with a separate and distinct video camera 120 (hereinafter "camera 120"). Embodiment 100A can include: display 110; power cable 111; plug 112; camera 120; shutter control unit 130; shutter 131; cable 132; power system 133; plug 134; socket 135; and outlet 140.

Display 110 may be various forms of an electronic display. Display 110 can be a television, monitor, desktop or laptop screen, gaming device, or some other form of electronic device with which a camera may be used in conjunction. Such uses can involve video conferencing, gaming, exercising (e.g., group participation in exercise classes or challenges), streaming, webcasting, and presentations.

Display 110 requires power to operate. Display 110 uses power cable 111 to receive power. Power cable 111 includes plug 112, which is shaped to connect with a socket of a power outlet. The specific shape of plug 112 can vary by jurisdiction.

Most end users think of display as functioning in two modes: on and off. Most displays, such as display 110, do not have a completely off mode, since display 110 needs to be ready to respond to a command from a remote device such as a remote control. Rather, display 110 can function in a standby mode or an active mode. "Standby mode" refers to a mode where the display screen of display 110 is deactivated and power consumption is relatively lower than in "active mode." "Active mode" refers to a mode where the display screen of display 110 is in use (e.g., an image or video presented) and the power consumption is relatively higher than in the "standby mode." From the perspective of an end user, standby mode is equivalent to a "power off" mode and active mode is equivalent to a "power on" mode.

The specific power usage of a given display make and model can vary significantly between standby and active mode. Further, differences in power usage among different makes and even different models of the same make exist between active mode and standby mode. Further detail about the varying power usages of different makes and models is provided in relation to FIG. 4. The variance in power usage may be due to design choices made by the manufacturer, the type of display (e.g., OLED, LCD, plasma), and which components are disabled in standby mode in addition to the display screen.

Camera 120 is typically a video camera; however, a camera capable of capturing only discrete still images is also possible. In FIG. 1A, camera 120 is a separate and discrete device that can be placed irrespective of the location of display 110. In this example, a user has placed camera 120 atop display 110. Camera 120 may have its own power cable, which may be integrated along with a data cable, such as in the form of a universal serial bus (USB) cable. Camera 120 may or may not have a shutter, such as a mechanical shutter, that is either controlled automatically by circuitry of camera 120 or can be manually actuated by a user.

ASCS 101 can include: shutter control unit 130; shutter 131; cable 132; and power system 133. Referring first to power system 133, power system 133 can be configured to serve as a power pass-through. Display 110 can receive power through power system 133. Power system 133 can have socket 135 into which plug 112 of display 110 is configured to be inserted. Power system 133 can further have plug 134 which is configured to be plugged into a power source, such as outlet 140. Outlet 140 is typically part of a household (or building) wiring system that receives power from a local power grid or possibly a household solar system. From the perspective of display 110, power is received just as if plug 112 was plugged directly into outlet 140.

Power system 133 can serve two functions: 1) deliver power to shutter control unit 130; and 2) sense the amount of power being consumed by display 110. Power system 133 includes power sensing circuitry 242, which is detailed in relation to FIGS. 2 and 3. An indication of the amount of power consumed (or an equivalent value, such as a measured current) can be provided to shutter control unit 130 via cable 132. Based on the indication, componentry of shutter control unit 130 physically moves shutter 131 between at least two distinct positions. When display 110 is determined to be in standby mode, shutter 131 is positioned to obscure (e.g., fully obscure) the field-of-view of a lens of camera 120. When display 110 is determined to be in an active mode, shutter 131 is positioned to allow the lens of camera 120 to fully view its field-of-view. An example of a position in which shutter 131 does not obscure the lens of camera 120 is illustrated in FIG. 1A.

ASCS 101 can be separate and distinct from camera 120. Rather, the automated shutter control system uses the state of display 110 to determine a shutter position, which effectively blocks or allows for use of camera 120.

The specific positions used for blocking and unblocking the lens of camera 120 can be configurable. That is, based on how ASCS 101 is positioned relative to camera 120, the position used for blocked and the position used for unblocked can be set by a user. In some embodiments, a user may manually move shutter 131 to the desired blocked position, which is then stored or otherwise retained for future use as the blocked position. Similarly, a user may manually move shutter 131 to the desired unblocked position, which is then stored or otherwise retained for future use as the unblocked position.

Figure 1B:
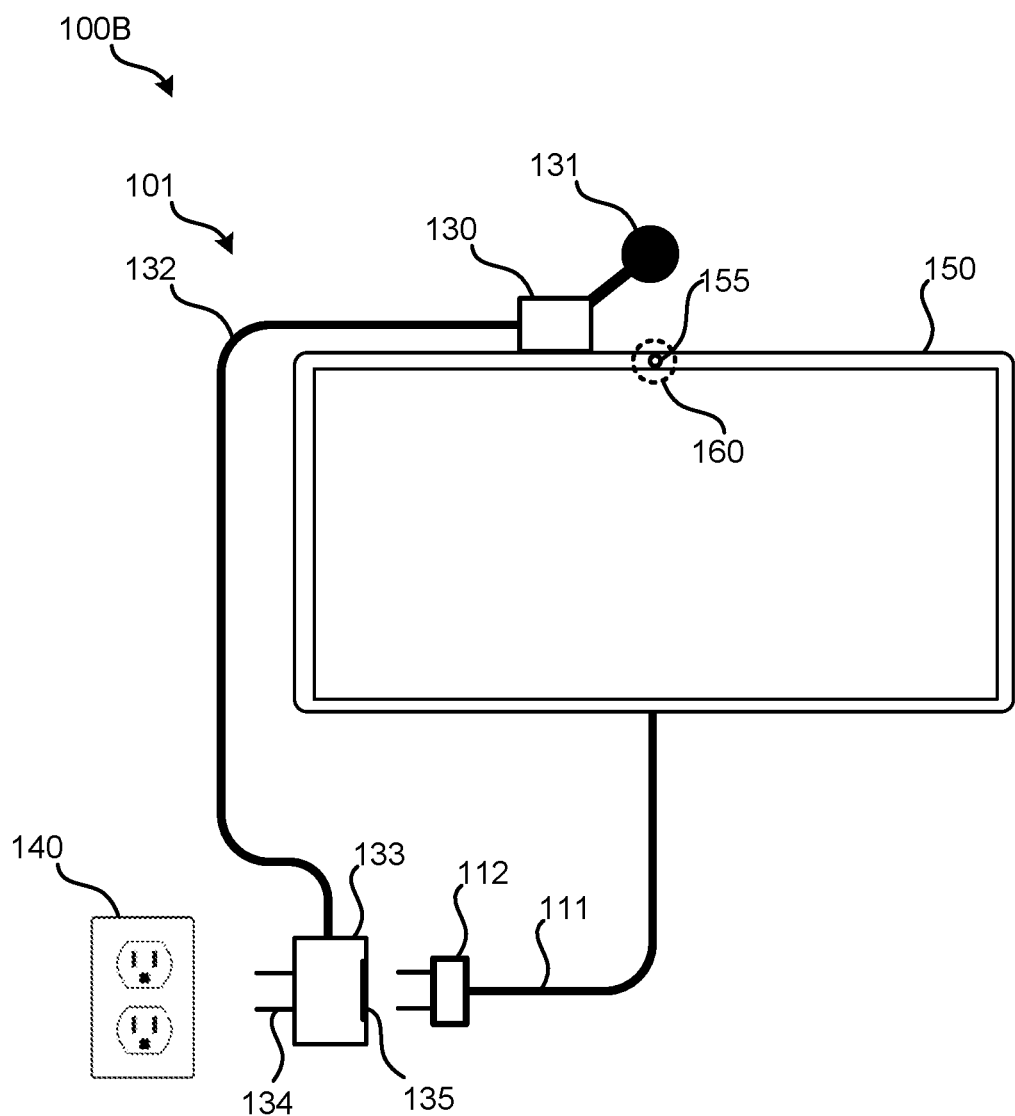
FIG. 1B illustrates an embodiment of an automated privacy shutter control system being used in conjunction with a display having an integrated video camera.

While FIG. 1A is focused on a camera that is separate and distinct from the display, FIG. 1B is focused on a camera that is integrated with a display. FIG. 1B illustrates an embodiment 100B of ASCS 101 being used in conjunction with display 150 which has an integrated camera 155. Camera 155 may or may not have a mechanical shutter that is either controlled automatically by the circuitry of camera 155 or can be manually actuated by a user. Even if such a shutter is present, ASCS 101 may be worthwhile for an end user to install because a manual shutter may be inadvertently left open by the end user and an automated shutter may be surreptitiously controlled by an unauthorized party via a network. Such control of ASCS 101 may not be possible: ASCS 101 may not have any network connection and may only actuate based on the power usage of the display and, possibly, some other arrangement that is limited to local control, such as an infrared or RF remote control.

Similar to embodiment 100A, embodiment 100B involves power (or some proxy, such as current) usage of display 150 that is sensed using power sensing circuitry of ASCS 101. Rather than using shutter 131 to obscure a separate camera, shutter 131 is used to block and unblock integrated camera 155. In embodiment 100B, based on how ASCS 101 is positioned relative to camera 155, the position used for blocking camera 155 varies from the position used for blocking camera 120 in embodiment 100A. As previously detailed, a user may manually move shutter 131 to the desired blocked position, such as position 160, which is then stored or otherwise retained for future use as the blocked position. Similarly, a user may manually move shutter 131 to the desired unblocked position, which is then stored or otherwise retained for future use as the unblocked position. In other embodiments, the blocked and unblocked positions may be set electronically by the user.

The specific size and shape of shutter 131 can be varied by embodiment. A relatively small size for shutter 131 may be needed due to the close proximity to the lens of camera 155 or camera 120. In some embodiments, rather than having plug 134 directly integrated with power system 133, a power cord may connect plug 134 to power system 133. Additionally or alternatively, socket 135 may be located at an end of a power cord which is connected to power system 133. In some embodiments, power may not be delivered to shutter control unit 130 via cable 132. Either a separate cable may be used or an alternative power source, such as a battery, may be used by shutter control unit 130.

A variation on ASCS 101 can involve sensing light rather than power usage. A light sensor of ASCS 101 may be aimed toward display 110. Based on determining an amount of light emitted by display 110, a similar determination can be made as to whether display 110 is in an active mode or is in standby mode.

Figure 2:
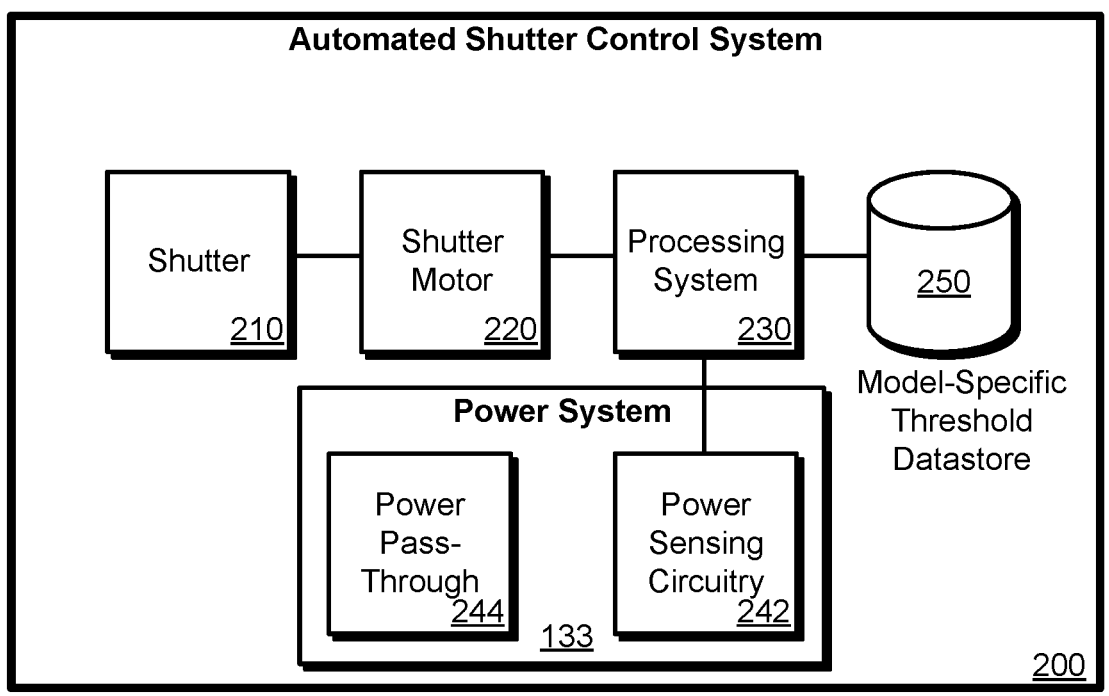
FIG. 2 illustrates a block diagram of an embodiment of an automated shutter control system.

FIG. 2 illustrates a block diagram of an embodiment of an ASCS. ASCS 200 of FIG. 2 can represent a block diagram of ASCS 101 of FIGS. 1A and 1B. ASCS 200 includes: shutter 210; shutter motor 220; processing system 230; power system 133; and model-specific threshold datastore 250.

Shutter 210 may be a rigid or semi-rigid piece of non-transparent material, such as made of plastic, rubber, or metal, that is movable by shutter motor 220. Shutter motor 220 is capable of physically moving shutter 210 between at least two positions, one of which blocks a lens of a camera and one of which does not block the lens of the camera. Shutter motor 220 may be housed as part of the shutter control unit 130 as indicated in FIGS. 1A and 1B.

Shutter motor 220 can be in communication with and controlled by processing system 230. Processing system 230 may, at minimum, include circuitry that can output a signal based on the amount of power or equivalent measured by power sensing circuitry 242. Processing system 230 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Power system 133 can include: power pass-through 244 and power sensing circuitry 242. Power pass-through 244 allows for power received via plug 134 to be passed through to socket 135, thus allowing a display that is plugged in to receive power. Power pass-through 244 can include conductive connections between plug 134 and socket 135. Intervening circuitry of power sensing circuitry 242 can be present. Power sensing circuitry 242 can allow for a power usage at socket 135 or current through power pass-through 244 to socket 135 to be measured. An indication of the power or current can be transmitted by power sensing circuitry 242 to processing system 230 (e.g., via cable 132) when processing system 230 is installed within shutter control unit 130. In other embodiments, processing system 230 can be installed within power system 133. In such embodiments, a signal can be sent by processing system 230 via cable 132 to control shutter motor 220.

Figure 4:
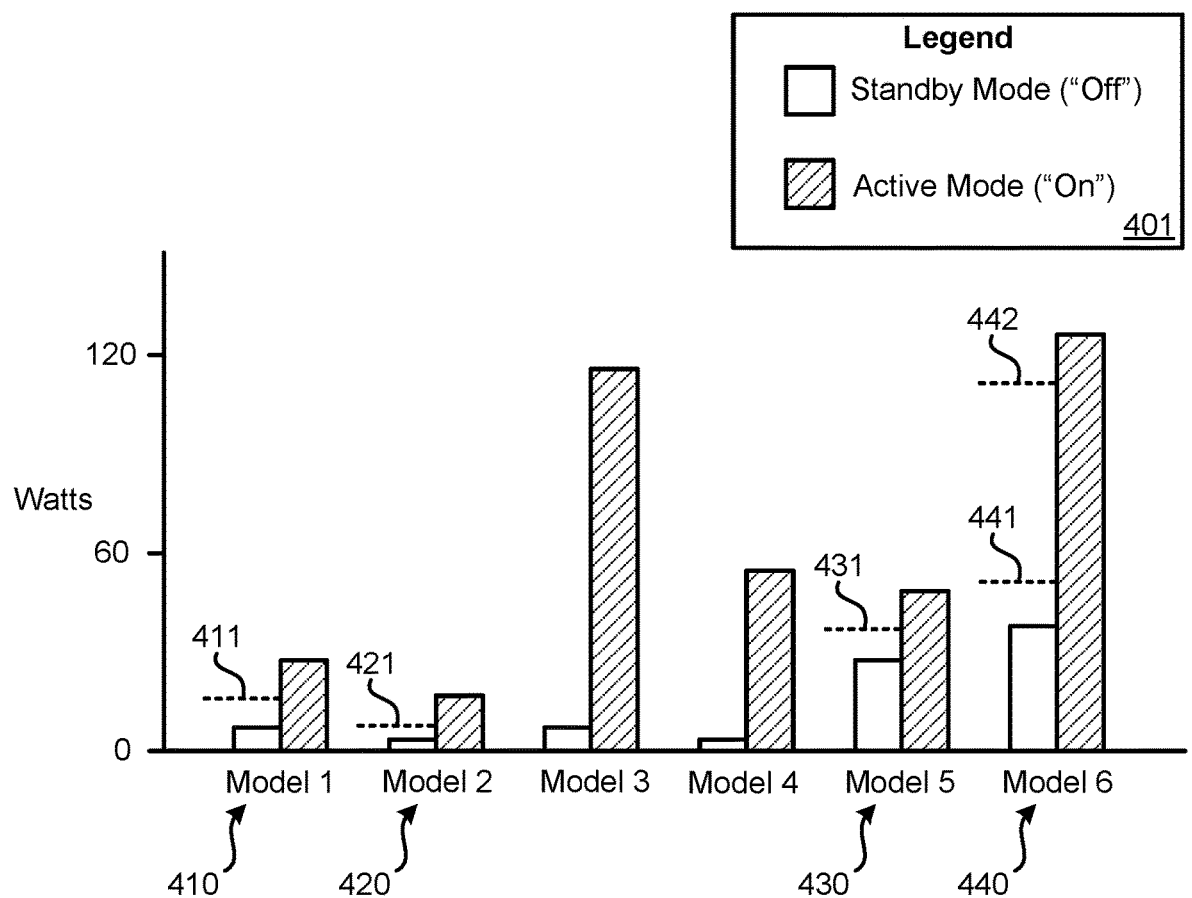
FIG. 4 illustrates a graph of the power usage of different makes and models of displays by mode.

Notably, the amount of power used by certain makes and models of displays varies substantially between modes. FIG. 4 illustrates a graph 400 of the power usage of different makes and models of displays by mode, as indicated by legend 401. Notably, certain makes and models of displays may use more power in standby mode than other makes and modes use in an active mode. Therefore, using a single threshold across all makes and models of displays may not allow ASCS 101 to be used with all displays. Rather, a threshold current or power usage specific to a display make and/or model may need to be used to ensure a camera is blocked and unblocked according to whether the display is in standby or active mode.

FIG. 4 indicates how the amount of power consumed by different makes and models (including different models of the same manufacturer) can exhibit substantially different power usage. The various models of FIG. 4 can be indicative of different makes, different models of the same make (manufacturer), or some variation thereof. For example, model 410 uses more power in standby mode and active mode than model 420. However, model 410 uses less power in active mode than model 440 uses in standby mode. Similarly, model 420 uses less power in active mode than model 430 in standby mode. Accordingly, a one-size-fits-all threshold may not be used for determining the mode in which a display is operating.

For each model illustrated, a different threshold may be used to determine the state. For example, threshold 411 may be suitable for model 410, but threshold 431, which is substantially greater than threshold 411, may be used for model 430. Similarly, threshold 421 may be used for model 420, which would not work for either model 410, model 430, or model 440.

In some embodiments, multiple thresholds may be used. For example, for model 440, to indicate a transition from standby mode to active mode, threshold 442 may need to be exceeded. However, to indicate a transition from active mode to standby mode, the power consumption may be required to drop below threshold 441. The use of hysteresis and multiple thresholds may increase the accuracy of the state determination by an automated shutter control system.

Returning to FIG. 2, a model-specific threshold datastore may be stored locally by ASCS 200 or otherwise may be accessible (e.g., via a network connection). A user may indicate the make and model of display which is connected with power pass-through 244. The user may provide this information via a user input component (not shown), such as a keyboard, buttons, knob, touchscreen, etc., of ASCS 200 or via a network connection (e.g., a Bluetooth connection between ASCS 200 and a computerized device of the user). Based on the make and model information provided, a lookup is performed by processing system 230 in model-specific threshold datastore 250. One or more thresholds that can be used to determine the model of the display connected with power pass-through 244 are obtained. Processing system 230 can then use these one or more thresholds to determine the mode of the connected display, which is then used to control shutter motor 220 and, thus, the position of shutter 210.

The thresholds stored to model-specific threshold datastore 250 can be defined by a manufacturer of ASCS 300. For example, the manufacturer of ASCS 300 may test a number of displays such that customized thresholds are defined for common makes and models of displays.

Figure 3:
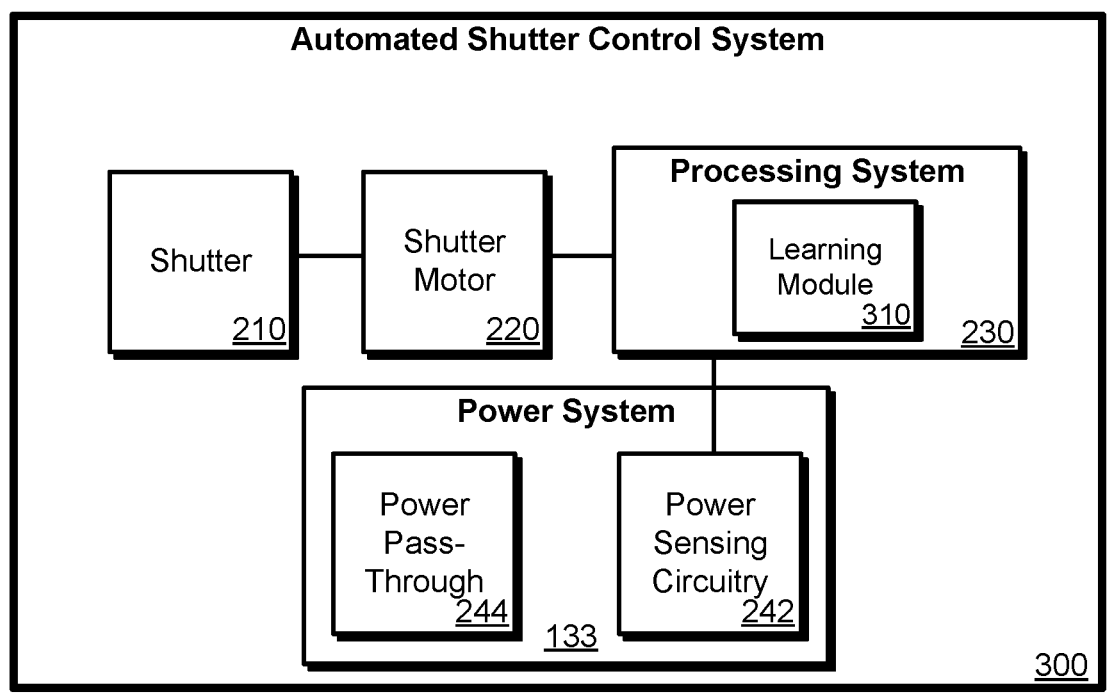
FIG. 3 illustrates a block diagram of another embodiment of an automated shutter control system.

Arrangements that use arrangements other than a model-specific threshold datastore 250 can be used. FIG. 3 illustrates a block diagram of an embodiment of ASCS 300 that uses learning module 310 in lieu of model-specific threshold datastore 250. Other components of ASCS 300 function as detailed in relation to FIG. 2.

When a display is connected with power pass-through 244, learning module 310 may monitor for a period of time. During this period of time, many samples of power being supplied to the display via power pass-through 244 may be monitored. A clustering algorithm may be applied to cluster samples into two groups. A first, lower-power group corresponds to standby mode; a second, higher-power group corresponds to active mode of the display. Once the period of time has elapsed, one or more thresholds may be calculated. For example, a mean value, representing a power level equidistant between the first group and the second group, can be used as the threshold (such as illustrated for threshold 431 of FIG. 4). Alternatively, multiple thresholds may be calculated such as 20% above and below the first group and the second group, respectively, to incorporate hysteresis as detailed in relation to threshold 441 and threshold 442 of FIG. 4. Use of this arrangement may not involve a user having to perform any specific steps other than connecting the display with power pass-through 244 and using the display normally.

In another arrangement, a user may actively participate in a setup process. After a display is connected with power pass-through 244, a user may be instructed to cycle the display's power such that it is in active mode for a period of time, then in standby mode for a period of time (or the reverse). One or more measurements may be taken by learning module 311 via power sensing circuitry 242 to determine power usage (or some equivalent) for each of the display's modes. A threshold may then be calculated as previously detailed.

A reset button or other form of user input arrangement may be present such that learning module 310 may be retrained when a different display is connected with power pass-through 244.

Figure 5:
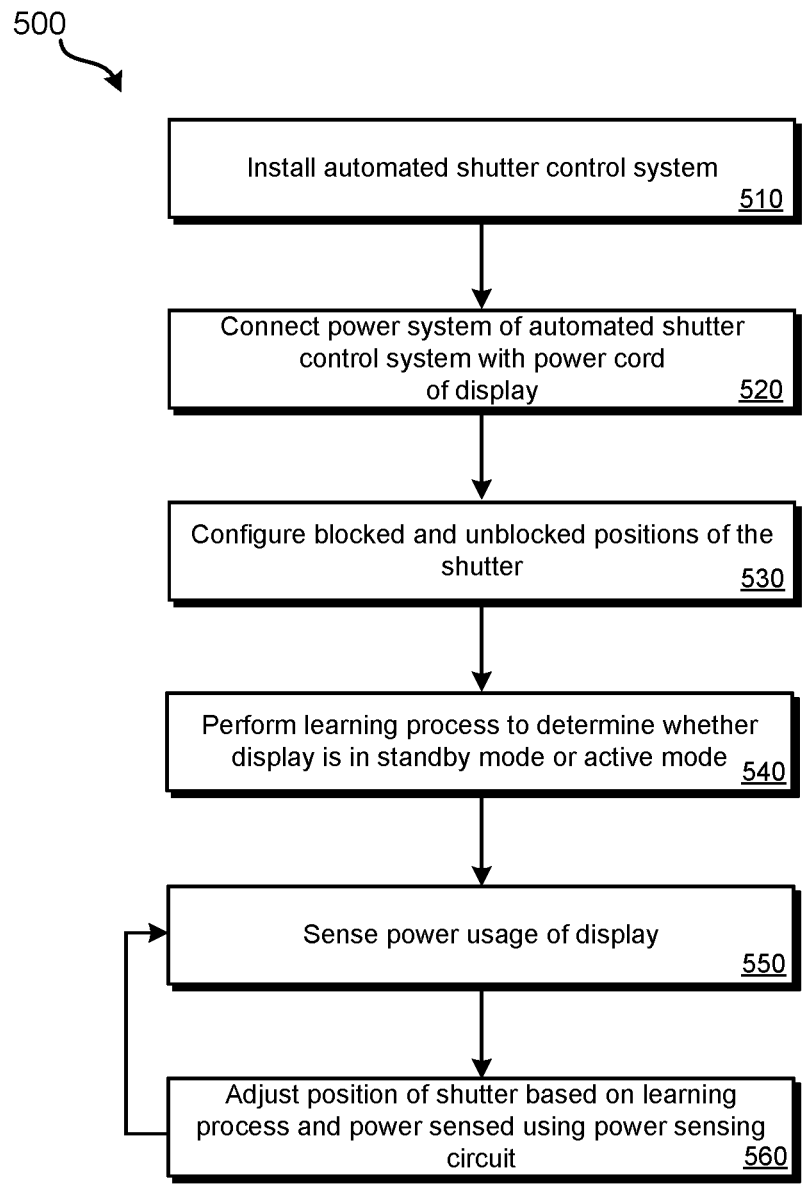
FIG. 5 illustrates an embodiment of a method for initially setting up and using an automated privacy shutter control system in conjunction with a camera and display.

Various methods can be performed using the systems and devices detailed in relation to FIGS. 1-3. FIG. 5 illustrates an embodiment of a method 500 for initially setting up and using an automated privacy shutter control system in conjunction with a camera and display. The camera of method 500 may be integrated with the display or may be separate and distinct. In either case, the ASCS used in method 500 is separate and distinct from the display and camera.

At block 510, the ASCS, such as ASCS 101 of FIGS. 1A and 1B, is installed. The ASCS may be connected with a power outlet and positioned such that a shutter of the ASCS is proximate to a camera that is to be blocked when a display is not in use.

At block 520, the power system of the ASCS is connected with a power cord of the display. The power cable through which the display receives power is plugged into a socket of the power system. The display receives power via the power system as if plugged into an outlet. However, the power system is able to measure power usage of the display or an equivalent value (e.g., current draw of the display). In some embodiments, rather than requiring the power cord of the display to be plugged into the power system of the ASCS, a current-sensing component may be placed in proximity to the power cord of the display.

At block 530, positions of the shutter of the ASCS may be configured. A user may manually move (or otherwise control) a position in which the shutter is set for the blocked position of the camera, the unblocked position of the camera, or both. The blocked position may vary substantially based on whether the camera is integrated with the display or separate, such as illustrated in FIGS. 1A and 1B. The one or more positions that were input may be stored by the processing system of the ASCS and used based on the determined state of the display.

At block 540, a learning process is performed to determine the mode of the connected display. In some embodiments, the learning process of block 540 involves looking up and retrieving a predefined threshold power usage value that can be used to assess whether the display is in an active mode or standby mode based on power usage. A user may be required to input an indication of the make and model to the ASCS in order to look up the correct threshold to be used. In other embodiments, a stand-alone or user-assisted training process is performed, as detailed in relation to FIG. 3.

Following block 540, the ASCS is ready for use. At block 550, power usage of the display is sensed via the power system of the ASCS. At block 560, the position of the shutter is adjusted based on the sensed power usage of the display and the performed learning process of block 540. If a user configures the blocked and unblocked positions, when the measured power is indicative of standby mode (e.g., below the retrieved or created threshold), the shutter is moved to the set blocked position; when the measured power is indicative of the active mode (e.g., above a retrieved or created threshold), the shutter is moved to the set unblocked position. If user-set positions of the shutter are not used, default or fixed positions may be used instead.

Figure 6:
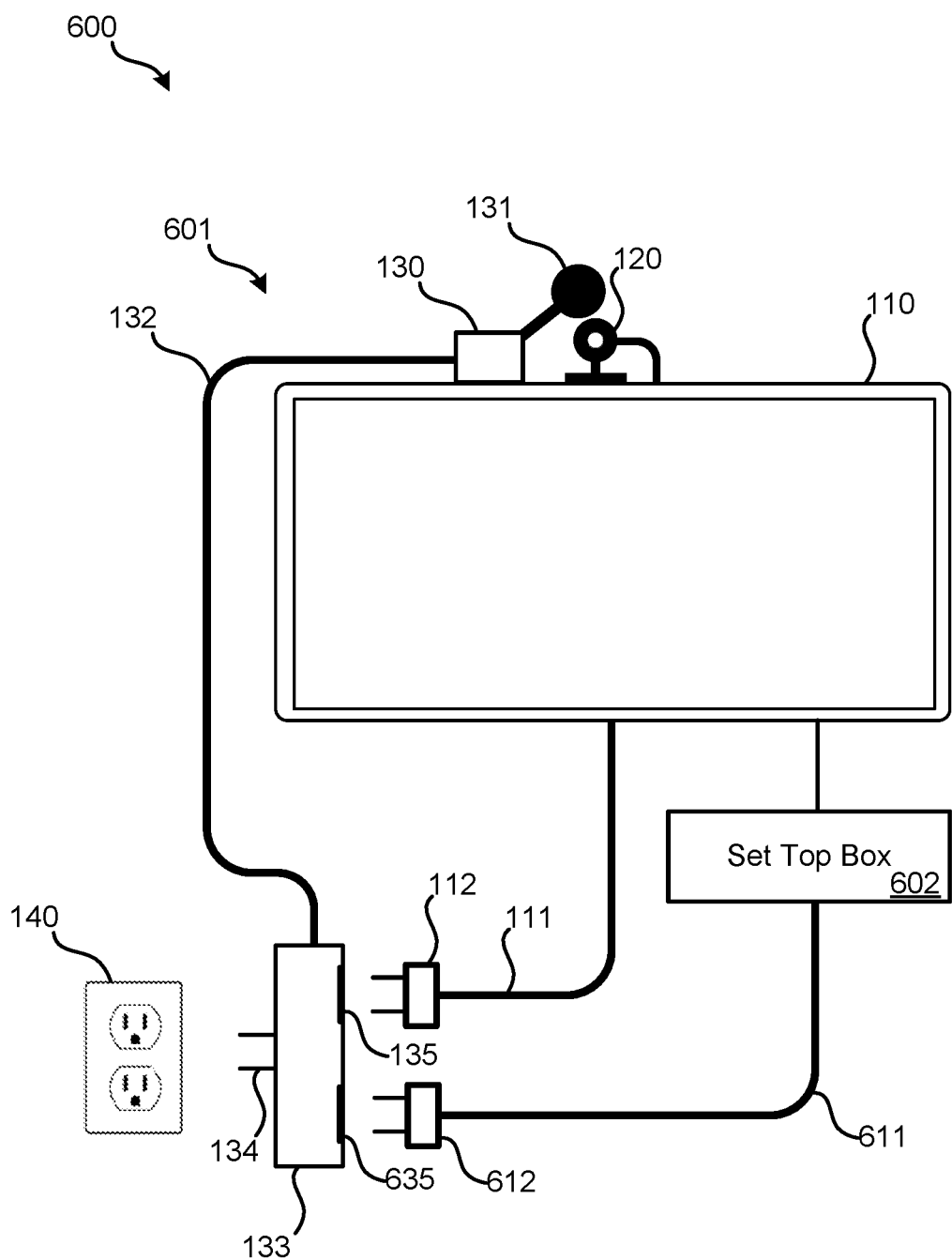
FIG. 6 illustrates another embodiment of an embodiment of a privacy shutter control system being used in conjunction with a display, a set top box, and a video camera.

FIG. 6 illustrates an embodiment 600 of ASCS 601. Embodiment 100A includes display 110 being used in conjunction with a separate and distinct video camera 120 (hereinafter "camera 120"). Embodiment 600 can include: display 110; power cable 111; plug 112; camera 120; shutter control unit 130; shutter 131; cable 132; power system 133; plug 134; socket 135; outlet 140; STB 602; power cable 611; plug 612, and socket 635.

Display 110 may be various forms of an electronic display. Display 110 can be a television, monitor, desktop or laptop screen, gaming device, or some other form of electronic device with which a camera may be used in conjunction. Such uses can involve video conferencing, gaming, exercising (e.g., group participation in exercise classes or challenges), streaming, webcasting, and presentations.

Display 110 requires power to operate. Display 110 uses power cable 111 to receive power. Power cable 111 includes plug 112, which is shaped to connect with a socket of a power outlet. The specific shape of plug 112 can vary by jurisdiction.

Camera 120 is typically a video camera; however, a camera capable of capturing only discrete still images is also possible. In FIG. 6, camera 120 is a separate and discrete device that can be placed irrespective of the location of display 110. In this example, a user has placed camera 120 atop display 110. Camera 120 may have its own power cable, which may be integrated along with a data cable, such as in the form of a universal serial bus (USB) cable. Camera 120 may or may not have a shutter, such as a mechanical shutter, that is either controlled automatically by circuitry of camera 120 or can be manually actuated by a user.

ASCS 601 can include: shutter control unit 130; shutter 131; cable 132; and power system 133. Referring first to power system 133, power system 133 can be configured to serve as a power pass-through. Display 110 can receive power through power system 133. Power system 133 can have socket 135 into which plug 112 of display 110 is configured to be inserted. Additionally or alternatively, plug 612 of STB 602 can be plugged into socket 635, thus resulting in STB 602 receiving power through power system 133 (and power cable 611). Therefore, depending on embodiment, either STB 602, display 110, or both receive power through power system 133.

Power system 133 can further have plug 134 which is configured to be plugged into a power source, such as outlet 140. Outlet 140 is typically part of a household (or building) wiring system that receives power from a local power grid or possibly a household solar system. From the perspective of display 110 and STB 602, power is received just as if plug 112 were plugged directly into outlet 140.

STB 602 directly communicates with display 110. STB 610 receives content from a television service provider, such as via satellite, or cable, or as an over-the-top (OTT) Internet service and outputs the content for presentation to display 110. Content can include on-demand content, broadcast content, and pay-per-view content. In the embodiment of FIG. 6, STB 602 does not directly communicate with power system 133; rather, power system 133 can sense the amount of power used by STB 602.

Power system 133 can serve two functions: 1) deliver power to shutter control unit 130; and 2) sense the amount of power being consumed by display 110 and/or STB 602. Power system 133 includes power sensing circuitry 242 and 942, which is detailed in relation to FIGS. 9 and 10. An indication of the amount of power consumed (or an equivalent value, such as a measured current) can be provided to shutter control unit 130 via cable 132 or analyzed locally within power system 133. Based on the indication, componentry of shutter control unit 130 physically moves shutter 131 between at least two distinct positions. When display 110 and STB 602 are determined to be in standby mode, shutter 131 is positioned to obscure (e.g., fully obscure) the field-of-view of a lens of camera 120. When display 110 and STB 602 are determined to be in an active mode, shutter 131 is either positioned to allow the lens of camera 120 to fully view its field-of-view or is eligible to be so positioned. An example of a position in which shutter 131 does not obscure the lens of camera 120 is illustrated in FIG. 6.

ASCS 101 can be separate and distinct from camera 120. Rather, the automated shutter control system uses the state of display 110 and/or STB 602 (and possibly other inputs, such as a voice command and/or fingerprint) to determine a shutter position, which effectively blocks or allows for use of camera 120.

The specific positions used for blocking and unblocking the lens of camera 120 can be configurable. That is, based on how ASCS 101 is positioned relative to camera 120, the position used for blocked and the position used for unblocked can be set by a user. In some embodiments, a user may manually move shutter 131 to the desired blocked position, which is then stored or otherwise retained for future use as the blocked position. Similarly, a user may manually move shutter 131 to the desired unblocked position, which is then stored or otherwise retained for future use as the unblocked position.

Figure 7:
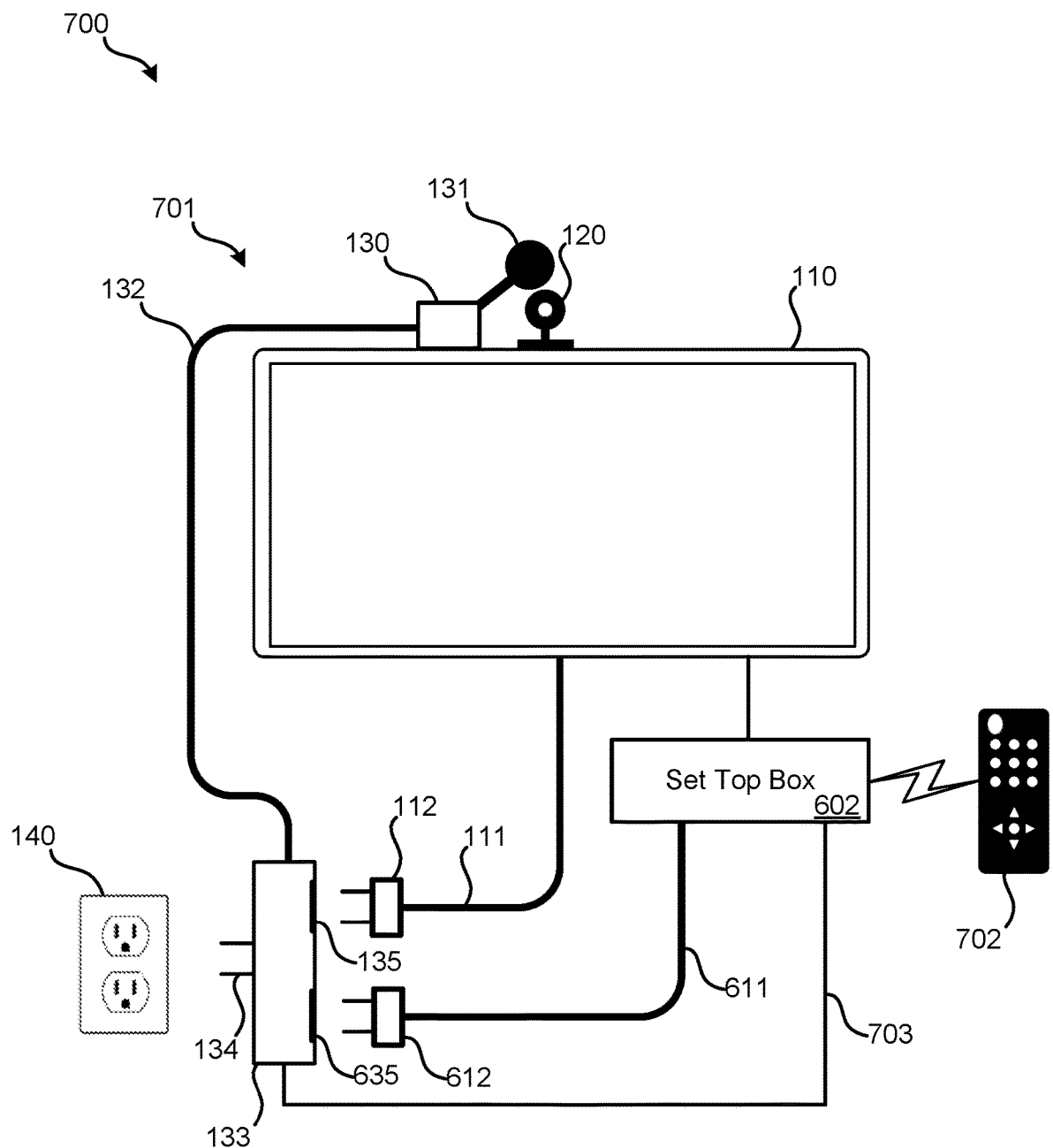
FIG. 7 illustrates another embodiment of an embodiment of a privacy shutter control system being used in conjunction with a display, a set top box, and a video camera.

FIG. 7 illustrates an embodiment of an embodiment 700 of a privacy shutter control system being used in conjunction with a display, a set top box, and a video camera. In embodiment 700, STB 602 communicates with a component of ASCS 701, such as power system 133 (as illustrated) or shutter control unit 130, such as using a universal serial bus (USB) connection. This arrangement allows for STB 602 to transmit messages to the processing system of ASCS.

In embodiment 700, remote control 702 is in wireless communication with STB 602. Remote control 702 allows for a user to provide a fingerprint via an on-board fingerprint sensor. Prior to use, a user performs a setup process in order to provide his or her fingerprint for use in determining whether future provided fingerprints correspond to an authorized user. A fingerprint provided by the user is compared to the stored fingerprint data either directly by remote control 702 or by STB 602.

After ASCS 701 has determined that both display 110 and STB 602 are in active modes, ASCS 701 can monitor for a message from STB 602 indicating that an authorized fingerprint has been received. If STB 602 receives an indication of an authorized fingerprint from remote control 702, STB 602 can transmit a message to ASCS 701, such as power system 133, indicating that an authorized fingerprint has been received.

Figure 8:
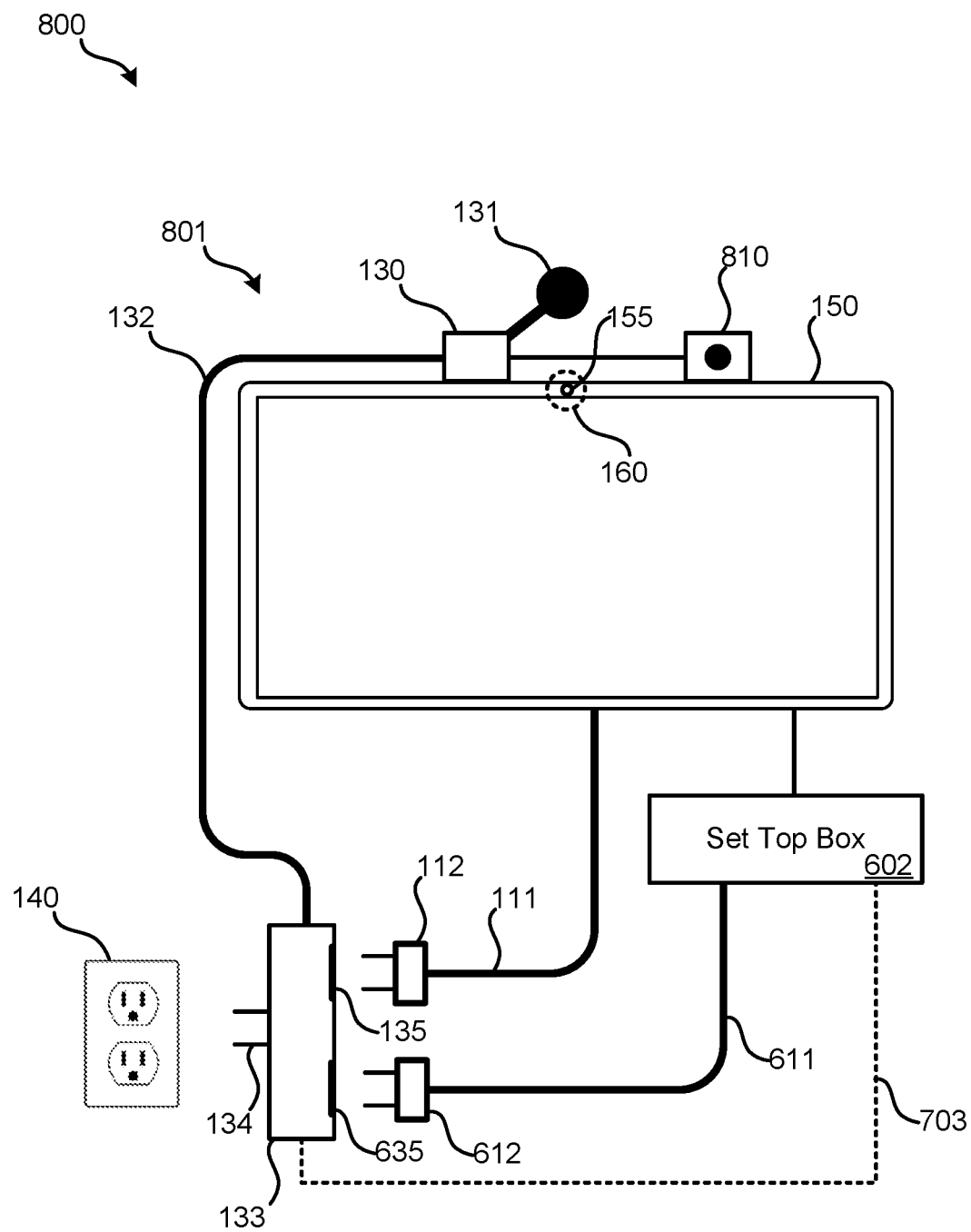
FIG. 8 illustrates another embodiment of an automated privacy shutter control system being used in conjunction with a display having an integrated video camera.

FIG. 8 illustrates an embodiment 800 of ASCS 801 being used in conjunction with display 150 which has an integrated camera 155. Camera 155 may or may not have a mechanical shutter that is either controlled automatically by the circuitry of camera 155 or can be manually actuated by a user. Even if such a shutter is present, ASCS 801 may be worthwhile for an end user to install because a manual shutter may be inadvertently left open by the end user and an automated shutter may be surreptitiously controlled by an unauthorized party via a network. Such control of ASCS 801 may not be possible: ASCS 801 may not have any network connection and may only actuate based on the power usage of the display and, possibly, some other arrangement that is limited to local control, such as an infrared or RF remote control.

Embodiment 800 involves power (or some proxy, such as current) usage of STB 602 and/or display 150 that is sensed using power sensing circuitry of ASCS 801. Rather than using shutter 131 to obscure a separate camera, shutter 131 is used to block and unblock integrated camera 155. In embodiment 800, based on how ASCS 101 is positioned relative to camera 155, the position used for blocking camera 155 varies from the position used for blocking camera 120 in embodiment 800. As previously detailed, a user may manually move shutter 131 to the desired blocked position, such as position 160, which is then stored or otherwise retained for future use as the blocked position. Similarly, a user may manually move shutter 131 to the desired unblocked position, which is then stored or otherwise retained for future use as the unblocked position. In other embodiments, the blocked and unblocked positions may be set electronically by the user.

The specific size and shape of shutter 131 can be varied by embodiment. A relatively small size for shutter 131 may be needed due to the close proximity to the lens of camera 155 or camera 120. In some embodiments, rather than having plug 134 directly integrated with power system 133, a power cord may connect plug 134 to power system 133. Additionally or alternatively, socket 135 may be located at an end of a power cord which is connected to power system 133. In some embodiments, power may not be delivered to shutter control unit 130 via cable 132. Either a separate cable may be used or an alternative power source, such as a battery, may be used by shutter control unit 130.

In embodiments 600, 700, and 800, spoken commands may provide an additional layer of security. Depending on embodiments, either the ASCS or the STB can receive a spoken command, analyze the command for content, and, possibly, determine if the command was spoken by an authorized user. In some embodiments, a microphone is incorporated into either power system 133 or shutter control unit 130. In other embodiments, a microphone is incorporated into remote control 702 or STB 602.

The device that includes the microphone can receive a spoken command from a user. For example, a user could speak a command such as "open the camera shutter" or "close the camera shutter." The voice command can be processed, either locally or using a cloud-based voice recognition service. The voice command can be analyzed for content to determine what the user is attempting to perform. Optionally, the voice command can be analyzed to compare the spoken command with a voice profile from an authorized user to determine if the voice command was spoken by an authorized user.

As examples of embodiments that use voice analysis, embodiment 600 can include a vocal command being received and analyzed by power system 133 or shutter control unit 130. In embodiment 700, STB 602 or remote control 702 may receive and analyze vocal commands. Referring to FIG. 8, power system 133, shutter control unit 130, or STB 602 may receive and analyze vocal commands. If vocal commands are analyzed by STB 602, communication path 703 may be present and used to relay an authorization command to ASCS 801.

In some embodiments, an additional sensor can be present as part of ASCS 801 that can detect the presence of a person. Sensor 810 can be an infrared sensor (e.g., passive infrared sensor) or a radar-based sensor that can detect the presence of a person. Detecting the presence of a person can be an additional step that is required to be performed before shutter 131 is opened. Sensor 810 can be incorporated into any of the preceding embodiments of ASCS systems. Sensor 810 may be connected with shutter control unit 130 or directly with power system 133. In some embodiments, sensor 810 is incorporated within a housing of shutter control unit 130 rather than being in a separate housing.

In some embodiments, rather than having a physical communication line between STB 602 and the ASCS, wireless communication can be used, such as Bluetooth or some other device-to-device wireless communication protocol. In some embodiments, communication path 703 is optional.

Figure 9:
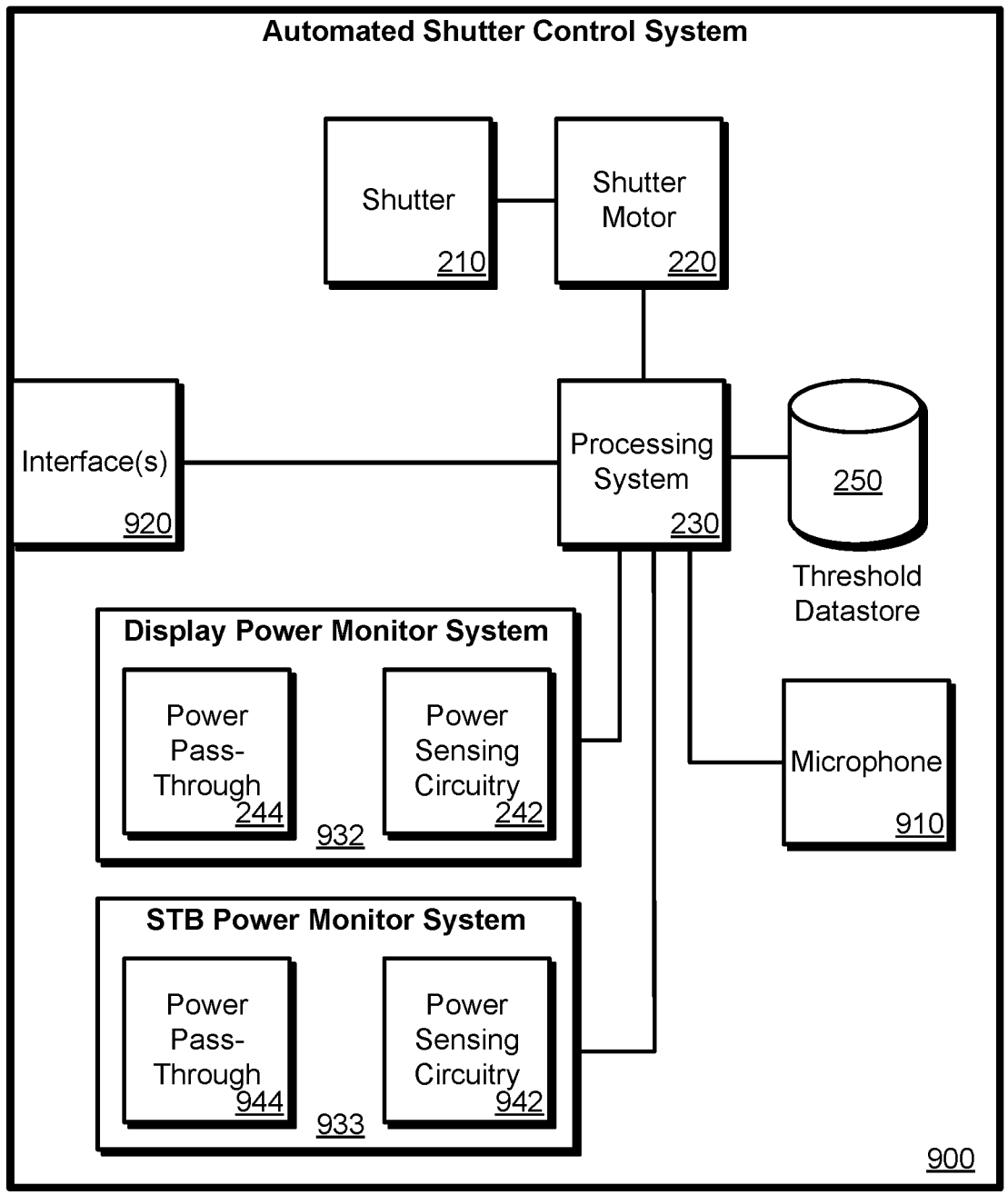
FIG. 9 illustrates a block diagram of an embodiment of an automated shutter control system.

FIG. 9 illustrates a block diagram of an embodiment of an automated shutter control system. ASCS 900 of FIG. 9 can represent a block diagram of the ASCS of FIGS. 6, 7, and 8. In addition to the components detailed in relation to ASCS 200 of FIG. 2, ASCS 900 can include STB power monitor system 933, microphone 910, and wired interfaces 920.

As previously detailed, shutter 210 may be a rigid or semi-rigid piece of non-transparent material, such as made of plastic, rubber, or metal, that is movable by shutter motor 220. Shutter motor 220 is capable of physically moving shutter 210 between at least two positions, one of which blocks a lens of a camera and one of which does not block the lens of the camera. Shutter motor 220 may be housed as part of the shutter control unit 130 as indicated in FIGS. 6, 7, and 8.

Shutter motor 220 can be in communication with and controlled by processing system 230. Processing system 230 may, at minimum, include circuitry that can output a signal based on the amount of power or equivalent measured by power sensing circuitry 242. Processing system 230 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Display power monitoring system 932 includes power pass-through 244 and power sensing circuitry 242 for use in monitoring the power usage of a display, such as a television. Display power monitoring system 932 can be present within power system 133. Power pass-through 244 allows for power received via plug 134 to be passed through to socket 135, thus allowing a display that is plugged in to receive power. Power pass-through 244 can include conductive connections between plug 134 and socket 135. Intervening circuitry of power sensing circuitry 242 can be present. Power sensing circuitry 242 can allow for a power usage at socket 135 or current through power pass-through 244 to socket 135 to be measured. An indication of the power or current can be transmitted by power sensing circuitry 242 to processing system 230 (e.g., via cable 132) when processing system 230 is installed within shutter control unit 130. In other embodiments, processing system 230 can be installed within power system 133. In such embodiments, a signal can be sent by processing system 230 via cable 132 to control shutter motor 220.

STB power monitor system 933 can additionally, or alternatively, be present in power system 133. STB power monitor system 933 includes power pass-through 944 and power sensing circuitry 942 for use in monitoring the power usage of an STB. Power pass-through 944 allows for power received via plug 134 to be passed through to socket 635, thus allowing an STB that is plugged in to receive power. Power pass-through 944 can include conductive connections between plug 134 and socket 635. Intervening circuitry of power sensing circuitry 942 can be present. Power sensing circuitry 942 can allow for a power usage at socket 635 or current through power pass-through 944 to socket 635 to be measured. An indication of the power or current can be transmitted by power sensing circuitry 942 to processing system 230.

As previously detailed in relation to FIG. 4, threshold datastore 250 can store various threshold levels for use in determining whether a display is in an active or standby mode. Various thresholds may also be stored for various makes and models of STBs. Alternatively, for either STBs, displays, or both, a learning process can be performed as detailed in relation to learning module 310 and block 540. Once threshold for each of the STB and display are determined, processing system 230 may require that both devices be determined to be in an active mode prior to actuating shutter 210 to an open position.

In some embodiments, multiple thresholds may be used for the STB, the display, or both. For example, referring to model 440 of FIG. 4, to indicate a transition from standby mode to active mode, threshold 442 may need to be exceeded. However, to indicate a transition from active mode to standby mode, the power consumption may be required to drop below threshold 441. The use of hysteresis and multiple thresholds may increase the accuracy of the state determination by an automated shutter control system.

Threshold datastore 250 may be stored locally by ASCS 900 or otherwise may be accessible (e.g., via a network connection). A user may indicate the make and model of display which is connected with power pass-through 244 and/or power pass-through 944. The user may provide this information via a user input component (not shown), such as a keyboard, buttons, knob, touchscreen, etc., of ASCS 900 or via a network connection (e.g., a Bluetooth connection between ASCS 900 and a computerized device of the user).

Based on the make and model information provided, a lookup is performed by processing system 230 in model-specific threshold datastore 250. One or more thresholds that can be used to determine the model of the display connected with power pass-through 244 are obtained. Processing system 230 can then use these one or more thresholds to determine the mode of the connected display and/or STB, which is then used to control shutter motor 220 and, thus, the position of shutter 210.

ASCS 900 can include on-board microphone 910 for use in receiving vocal commands. Microphone 910 can be located as part of power system 133 or shutter control unit 130. Audio received by microphone 910 may only be analyzed for a vocal command if processing system 230 has already determined that the display and the STB are in an active mode. In some embodiments, if either of these devices go to a standby mode, processing system 230 automatically closes shutter 210. Audio received by on-board microphone 910 can also be analyzed to ensure the person speaking a vocal command is authorized to do so. A voice profile of an authorized user can be stored and analyzed to determine if a spoken command is from an authorized user.

In some embodiments, rather than having microphone 910 on-board ASCS 900, a microphone of another device may be leveraged. For example, if a microphone is incorporated into an STB, display, or remote control in communication with the STB or display, the STB or display can relay a message to ASCS 900 via one or more interfaces 920. The message can indicate whether a voice command has been received that is requesting opening or closing of the shutter. The message may only be sent if the speaker of the voice command is authorized to submit such a command. A similar message can be used if an authorized fingerprint is received. Interface 920 may be a wired connection, such as a USB connection. Alternatively, interface 920 may include the use of a wireless connection, such as via a wireless local area network, or a device-to-device protocol, such as Bluetooth.

Via a network connection, audio assistant devices can also be paired and leveraged. For example, ASCS 900 can be paired with a Google® Home Assistant or Apple® Siri® device to allow for voice commands to open and close the shutter to be submitted through such third-party devices.

Figure 10:
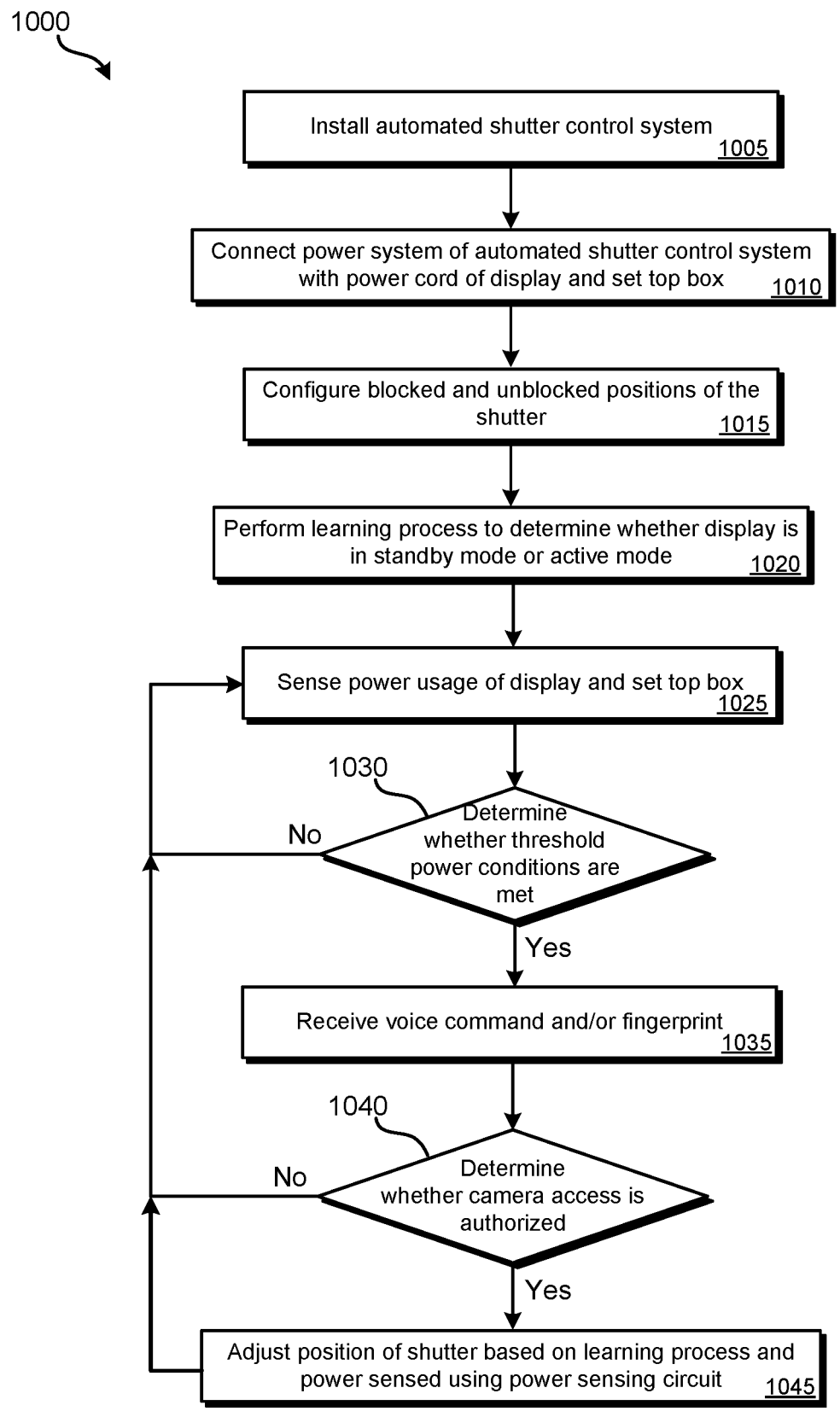
FIG. 10 illustrates another embodiment of a method for initially setting up and using an automated privacy shutter control system in conjunction with a camera and display.

Various methods can be performed using the systems and devices detailed in relation to FIGS. 6-9. FIG. 10 illustrates an embodiment of a method 1000 for initially setting up and using an automated privacy shutter control system in conjunction with a camera, an STB, and a display. The camera of method 1000 may be integrated with the display (e.g., FIG. 8) or may be separate and distinct (e.g., FIG. 6). In either case, the ASCS used in method 1000 is separate and distinct from the display and camera.

At block 1005, the ASCS, such as ASCS 900, is installed. The ASCS may be connected with a power outlet and positioned such that a shutter of the ASCS is proximate to the lens of the camera to be blocked and unblocked.

At block 1010, the power system of the ASCS is connected with a power cord of the display, the STB, or both. The power cables through which the display and STB receive power is plugged into the sockets of the power system of the ASCS. The display and STB receive power via the power system as if plugged into an outlet. However, the power system is able to measure power usage or related value (e.g., current draw) of the display and STB. In some embodiments, rather than requiring the power cord of the display or STB to be plugged into the power system of the ASCS, a current-sensing component may be placed in proximity to the power cord of the display, STB, or both.

At block 1015, positions of the shutter of the ASCS may be configured. A user may manually move (or otherwise control) a position in which the shutter is set for the blocked position of the camera, the unblocked position of the camera, or both. The blocked position may vary substantially based on whether the camera is integrated with the display or separate, such as illustrated in FIGS. 7 and 8. The one or more positions that were input may be stored by the processing system of the ASCS and used for the open and closed positions. In other embodiments, the ASCS has preset open and closed positions for the shutter that are used and no configuration is necessary.

At block 1020, a learning process may be performed to be able to detect the current mode of the connected display, the connected STB, or both based on power consumed. In some embodiments, the learning process of block 1020 involves looking up and retrieving a predefined threshold power usage value that can be used to assess whether the display or STB is in an active mode or standby mode based on power usage based on make and model. A user may be required to input an indication of the make and model to the ASCS in order to look up the correct threshold to be used. In other embodiments, a stand-alone or user-assisted training process is performed, as detailed in relation to FIG. 3. Separate training may be performed for an STB and display. In some embodiments, the make and model of the STB may be known, so no learning process may be needed.

Following block 1020, the ASCS is ready for use. Therefore, once set up, using the ASCS may only involve block 1025 through block 1045. At block 1025, power usage of the display and STB is sensed via the power system of the ASCS. If both the power usage of the STB and display is monitored, block 1030 may be required to be determined that the STB and the display are consuming power consistent with active modes for block 1030 to proceed to block 1035. This comparison involves determining if the consumed power is greater than the corresponding defined threshold values for the display and STB. If one device does not meet the threshold and thus block 1030 is determined in the negative, if the shutter is open, the shutter may be closed and method 1000 may return to block 1025.

At block 1035, the ASCS may now be eligible to receive a voice command and/or a fingerprint. The microphone of the ASCS may only be activated or monitored following block 1030. A voice command may be directly received by the ASCS or received by another device (e.g., a remote control). If received by the ASCS, the ASCS may directly determine whether a user is requesting the shutter be opened (or closed). If received by another device, the other device may analyze the audio and determine what the user is requesting. An authorization message can then be sent to the ASCS, such as via a wired USB connection or some other interface. If the voice command is analyzed by a remote control, the remote control may transmit a message to the STB, which may communicate with the ASCS.

In some embodiments, an additional security feature can involve confirming that speaker of the voice command is authorized to control the ASCS. The remote control, STB, or ASCS can compare the voice that spoke the voice command with a pre-existing profile to determine if the user is authorized. The ASCS may only be instructed to actuate the shutter if the user is determined to be authorized.

Additionally or alternatively to receiving and analyzing a voice command, a fingerprint may be received and analyzed by the ASCS (e.g., via an on-board fingerprint sensor) or received and analyzed by another device (e.g., an STB, a remote control). If received by the ASCS, the ASCS may directly determine whether a user who provided the fingerprint is authorized to open (and/or close) the shutter, such as by comparison with a stored authorized fingerprint. If received by another device, the other device may analyze the fingerprint and cause an authorization message to be sent to the ASCS, such as via a wired USB connection or some other interface. If the fingerprint is analyzed by a remote control, the remote control may transmit a message to the STB, which may communicate with the ASCS.

At block 1040, a determination of whether camera access is authorized is determined by the ASCS. This determination can require that: 1) the STB is determined to be active; 2) the display is determined to be active; and 3) a voice command and/or fingerprint be determined as authorized. If determined in the negative, method 1000 returns to block 1025. In some embodiments, proper authorization is only needed for opening the shutter; any user is permitted to have the shutter closed.

At block 1045, the position of the shutter is adjusted based on block 1040 being determined in the affirmative. Therefore, at block 1045, the shutter may be moved to the open position, thus allowing the lens of the camera a field of view of the ambient environment. When either of blocks 1030 or 1040 are determined in the negative, if the shutter is in the open position, the shutter may be moved to the closed position that blocks the field of view of the lens of the camera.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An automated shutter control system, the automated shutter control system comprising:
   a shutter configured to block a lens of a camera;
   a shutter motor that moves the shutter;
   a first socket configured to be connected with a first power cable plug of a set top box (STB);
   a plug configured to be connected with an outlet through which power is received for the automated shutter control system and the STB;
   a power sensing circuitry that measures a first amount of power being supplied to the STB; and
   a processing system, comprising one or more processors, that is in communication 11 with the shutter motor and the power sensing circuitry, wherein the processing system is configured to:
   based on the first amount of power being supplied to the STB as measured by the power sensing circuitry, transmit a signal to the shutter motor that causes the shutter to be actuated to an unblocked position or a blocked position.

2. The automated shutter control system of claim 1, further comprising:
   a second socket configured to be connected with a second power cable plug of a display, wherein:
      the power sensing circuitry further measures a second amount of power being supplied to the display, wherein:
         the processing system is configured to transmit the signal to the shutter motor additionally based on the second amount of power being supplied to the display.

3. The automated shutter control system of claim 2, wherein the processing system is further configured to:
   receive an indication of a make and a model of the display; and
   access a data store to retrieve a threshold value mapped to the make and the 4 model of the display.

4. The automated shutter control system of claim 3, wherein the processing system is further configured to:
   compare the retrieved threshold value with the amount of power being supplied to the display; and
   transmit the signal to the shutter motor that causes the shutter to be actuated to the unblocked position or the blocked position further based on comparing of the amount of power with the retrieved threshold value mapped to the make and the model of the display.

5. The automated shutter control system of claim 2, wherein the processing system is further configured to:
   perform a learning process that comprises:
      monitoring a power usage of the display for at least a defined period of time; and
      determining an active power usage value and a standby power usage value for the display based on monitoring the power usage for at least the defined period of time.

6. The automated shutter control system of claim 5, wherein the processing system is further configured to:

calculate a threshold value using the determined active power usage value and the determined standby power usage value;
compare the calculated threshold value with the amount of power being supplied to the display; and
transmit the signal to the shutter motor that causes the shutter to be actuated to the unblocked position or the blocked position further based on comparing of the amount of power with the calculated threshold value.

7. The automated shutter control system of claim 1, wherein the processing system is further configured to:
receive a spoken voice command; and
analyze the spoken voice command, wherein the processing system being configured to transmit the signal to the shutter motor is further based on the analyzed spoken voice command.

8. The automated shutter control system of claim 7, wherein the processing system is further configured to:
analyze the first amount of power being supplied to the STB, wherein the spoken voice command is received after analyzing the first amount of power being supplied to the STB.

9. The automated shutter control system of claim 7, wherein analyzing the spoken voice command comprises determining that the spoken voice command was spoken by an authorized user.

10. The automated shutter control system of claim 1, further comprising the STB, wherein the STB is configured to:
receive a spoken voice command via a microphone of the STB;
analyze the spoken voice command; and
transmit a message to the processing system indicative of the spoken voice command.

11. The automated shutter control system of claim 1, further comprising a remote control and the STB, wherein:
the remote control is in wireless communication with the STB and the remote control comprises a fingerprint sensor; and
the remote control is configured to:
receive a fingerprint via the fingerprint sensor; and
transmit an indication of the fingerprint to the STB, wherein the STB transmits an indication of the fingerprint being authorized to the processing system.

12. The automated shutter control system of claim 1, wherein the shutter, when in the blocked position, blocks a camera lens of a video camera, the video camera being separate and distinct from the automated shutter control system.

13. The automated shutter control system of claim 12, wherein the shutter, when in the unblocked position, permits the camera lens of the video camera a field of view unobstructed by the shutter.

14. The automated shutter control system of claim 1, wherein the camera is separate and distinct from the automated shutter control system.

15. The automated shutter control system of claim 1, wherein the camera is integrated with a display.

16. A method for using an automated privacy shutter control system, the method comprising:
installing an automated shutter control system such that a plug of the automated shutter control system is connected with an outlet through which power is received for the automated shutter control system, and a set top box (STB), wherein the automated shutter control system comprises:
a shutter configured to block a lens of a camera;
a shutter motor that moves the shutter;
the plug configured to be connected with the outlet;
a first socket configured to be connected with a first power cable plug of the STB;
circuitry that measures an amount of power being supplied to the STB; and
connecting the first socket of the automated shutter control system with the first power cable plug of the STB; and
adjusting a position of the shutter of the automated shutter control system based on the amount of power being supplied to the STB.

17. The method of claim 16, wherein the automated shutter control system further comprises:
a second socket configured to be connected with a second power cable plug of a display, the method further comprising:
connecting the second socket of the automated shutter control system with the second power cable plug of the display, wherein the circuitry further measures a second amount of power being supplied to the display and the position of the shutter is further adjusted based on the second amount of power being supplied to the display.

18. The method of claim 16, further comprising:
receiving a spoken voice command from a microphone; and
analyzing the spoken voice command to determine if access to the camera is permitted, wherein adjusting the position of the shutter is further based on the spoken voice command.

19. The method of claim 18, wherein the spoken voice command is only eligible to be received after the amount of power supplied to the STB is determined to be above a threshold.

20. The method of claim 18, wherein analyzing the spoken voice command comprises determining that the spoken voice command was spoken by an authorized user.

* * * * *

UNITED STATES PATENT AND TRADEMARK OFFICE
CERTIFICATE OF CORRECTION

| | | |
|---|---|---|
| PATENT NO. | : 12,326,655 B2 | Page 1 of 1 |
| APPLICATION NO. | : 18/544743 | |
| DATED | : June 10, 2025 | |
| INVENTOR(S) | : Vikram Balaraja Shetty et al. | |

It is certified that error appears in the above-identified patent and that said Letters Patent is hereby corrected as shown below:

In the Claims

In Claim 1, Column 18, Line 23, please delete "11"

In Claim 3, Column 18, Line 47, please delete "4"

Signed and Sealed this
Sixteenth Day of December, 2025

John A. Squires
*Director of the United States Patent and Trademark Office*